(12) United States Patent
Capon et al.

(10) Patent No.: US 8,286,428 B2
(45) Date of Patent: Oct. 16, 2012

(54) INLET SYSTEM FOR AN ENGINE

(75) Inventors: Geoffrey Charles Capon, Chelmsford (GB); Wa-Un Alexis Leong, Chelmsford (GB); Scott James Martin, Canvey Island (GB)

(73) Assignee: Ford Global Technologies, Dearborn, MI (US)

( * ) Notice: Subject to any disclaimer, the term of this patent is extended or adjusted under 35 U.S.C. 154(b) by 100 days.

(21) Appl. No.: 12/606,479

(22) Filed: Oct. 27, 2009

(65) Prior Publication Data
US 2010/0122531 A1 May 20, 2010

(30) Foreign Application Priority Data

Nov. 19, 2008 (GB) .................................. 0821089.0

(51) Int. Cl.
| F02B 33/44 | (2006.01) |
| F02B 31/00 | (2006.01) |
| F02M 29/02 | (2006.01) |
| F01D 1/02 | (2006.01) |
| F04D 29/44 | (2006.01) |
| F04D 29/52 | (2006.01) |

(52) U.S. Cl. ....... 60/605.1; 415/183; 415/191; 123/306; 123/592

(58) Field of Classification Search .............. 60/605.1, 60/605.2, 602; 415/159–164, 119, 212.1, 415/205–206, 182.1, 208.1–208.2; 123/306–307; 138/37, 39; 48/189.4; 417/407
See application file for complete search history.

(56) References Cited

U.S. PATENT DOCUMENTS

| 1,215,451 | A | * | 2/1917 | White .............................. 60/696 |
| 1,974,110 | A | * | 9/1934 | Higley ............................. 138/39 |
| 2,303,949 | A | * | 12/1942 | Nordell ........................... 138/39 |
| 2,433,156 | A | * | 12/1947 | Pezzillo ....................... 415/212.1 |
| 3,071,075 | A | * | 1/1963 | Spring .......................... 415/206 |
| 3,910,715 | A | * | 10/1975 | Yedidiah ..................... 415/182.1 |
| 3,986,790 | A | * | 10/1976 | Yamaguchi et al. ....... 415/182.1 |
| 4,375,939 | A | | 3/1983 | Mount et al. .................. 415/157 |
| 4,504,216 | A | * | 3/1985 | Hagar et al. .................. 431/183 |
| 4,537,173 | A | * | 8/1985 | Norris ........................... 123/592 |
| 4,695,225 | A | * | 9/1987 | Hellat et al. ............... 415/208.1 |

(Continued)

FOREIGN PATENT DOCUMENTS

DE 3817839 A1 * 12/1989

(Continued)

OTHER PUBLICATIONS

A fully Certifed English Translation of JP 08-326689 A, published on Dec. 10, 1996.*

*Primary Examiner* — Thai Ba Trieu
(74) *Attorney, Agent, or Firm* — Julia Voutyras; Brooks Kushman P.C.

(57) ABSTRACT

An apparatus for improving the performance of a radial compressor 36 forming part of an inlet system of an engine 10 is disclosed in which the configuration and positioning of a flow management device 137 used to generate pre-whirl is optimized so as to produce a pressure drop below a maximum acceptable level. An inlet duct 'I' connected to the radial compressor 36 has a tapered end portion so that a flow management device 137 of a larger diameter d2 can be accommodated than the diameter d1 of an inlet port 'IP' to the radial compressor 36.

11 Claims, 4 Drawing Sheets

U.S. PATENT DOCUMENTS

| | | | |
|---|---|---|---|
| RE32,756 E * | 9/1988 | Mowill | 415/161 |
| 4,780,055 A * | 10/1988 | Zloch et al. | 415/160 |
| 5,161,946 A * | 11/1992 | Bortz et al. | 415/183 |
| 5,186,607 A * | 2/1993 | Yang et al. | 415/208.1 |
| 5,483,791 A * | 1/1996 | Kotwal et al. | 415/182.1 |
| 5,529,084 A * | 6/1996 | Mutsakis et al. | 138/37 |
| 5,611,664 A * | 3/1997 | Haugen | 415/146 |
| 5,807,073 A * | 9/1998 | Jensen et al. | 415/206 |
| 5,851,105 A * | 12/1998 | Fric et al. | 415/208.1 |
| 5,992,465 A * | 11/1999 | Jansen | 138/37 |
| 6,012,897 A * | 1/2000 | Sabnis et al. | 415/119 |
| 6,258,144 B1 * | 7/2001 | Huang | 123/593 |
| 6,273,677 B1 * | 8/2001 | Wang et al. | 415/191 |
| 6,520,738 B2 * | 2/2003 | Sheoran et al. | 415/205 |
| 6,536,420 B1 * | 3/2003 | Cheng | 123/590 |
| 6,796,296 B2 * | 9/2004 | Kim | 123/590 |
| 6,928,979 B2 * | 8/2005 | Chen | 123/306 |
| 7,108,488 B2 * | 9/2006 | Larue et al. | 417/407 |
| 7,416,573 B2 * | 8/2008 | Lindgren et al. | 55/315 |
| 7,552,723 B1 * | 6/2009 | Ugalde | 123/592 |
| 2003/0140892 A1 * | 7/2003 | Kim | 123/306 |
| 2004/0009061 A1 * | 1/2004 | McDonald | 415/151 |
| 2004/0096316 A1 | 5/2004 | Simon et al. | 415/151 |
| 2005/0002782 A1 | 1/2005 | Nikpour et al. | 415/208.1 |
| 2006/0042588 A1 * | 3/2006 | Kindl et al. | 123/306 |
| 2008/0127644 A1 | 6/2008 | Codan et al. | |
| 2009/0301085 A1 * | 12/2009 | Heyes | 60/611 |
| 2009/0324392 A1 * | 12/2009 | Fleischer et al. | 415/147 |
| 2011/0048003 A1 * | 3/2011 | Chen | 415/203 |

FOREIGN PATENT DOCUMENTS

| | | | |
|---|---|---|---|
| DE | 102007039120 A1 * | 2/2009 | |
| EP | 196967 A1 * | 10/1986 | |
| EP | 0685653 A2 | 6/1995 | |
| EP | 1416123 A2 | 5/2004 | |
| GB | 1283561 | 7/1972 | |
| GB | 1315433 | 2/1973 | |
| GB | 2168433 A | 6/1986 | |
| GB | 2391265 A | 4/2004 | |
| JP | 08326689 A * | 12/1996 | |
| JP | 2002070793 A * | 3/2002 | |
| JP | 2002115696 A * | 4/2002 | |
| JP | 2002122097 A * | 4/2002 | |

* cited by examiner

INLET SYSTEM FOR AN ENGINE

CROSS-REFERENCE TO RELATED APPLICATIONS

This application claims foreign priority benefits under 35 U.S.C. §119(a)0(d) to GB 0821089.0 filed Nov. 19, 2008, which is hereby incorporated by reference in its entirety.

BACKGROUND

1. Technical Field

This disclosure relates to improving the performance of a radial compressor and in particular to improving the performance of a radial compressor used for increasing the inlet pressure of an internal combustion engine equipped with a turbocharger or supercharger.

2. Background Art

It is well known to use a radial compressor in the form of a turbocharger or supercharger to increase the pressure of the air entering an engine to reduce emissions and/or increase power.

It is a problem with such radial compressors that the flow field presented to the inlet of a turbocharger compressor influences the operation of the compressor. A high relative velocity between the working fluid (air) and the vanes of the compressor can lead to separation of the flow from the suction side of the vanes resulting in compressor rotating stall and/or compressor surge. These phenomena give rise to reduced compressor stage efficiency and undesirable noise radiation, sometimes referred to as turbocharger whoosh.

It is known to use a flow management device having a number of fixed vanes located upstream from the compressor to induce a swirl to the air entering the compressor so as to minimize or eliminate the above referred to problems. However, such flow management devices may create a further problem because they reduce the effective cross-sectional area of the inlet to the compressor and thereby restrict the flow of air to the compressor. This may result in the compressor being starved for air causing runaway or inlet manifold instability such as back flow particularly at high speeds and loads.

Although the occurrence of excessive back pressure can be overcome by the use of vanes whose rotational position can be adjusted, such an arrangement is undesirable for many small vehicle applications because of the added cost and complexity. For example, adjustable vanes have an actuator for making the adjustment as well as a control mechanism for the actuator. Such a control mechanism determines when the vanes need to be adjusted and what position the vanes have to be moved to typically based on one or more feedback sensors and an electronic controller programmed to control the vane position based upon the feedback signals received from the feedback sensors. In addition to the cost and complexity issues associated with the use of a flow management device having moveable vanes, there may also be a problem of package space when the radial compressor is one fitted to a small vehicle.

SUMMARY

According to an embodiment of the disclosure there is provided an inlet system for an engine comprising an inlet manifold for supplying air to the engine, a radial compressor having a compressor wheel mounted in a compressor housing for rotation about an axis, an inlet port in the housing through which gas is supplied to the compressor wheel, an outlet port in the housing through which gas at increased pressure is supplied to the inlet manifold, an inlet duct connected to the inlet port to provide air to the radial compressor, and a flow management device having a number of radially-extending fixed vanes positioned in the inlet duct upstream from the inlet port to impart a swirling motion to the gas entering through the inlet port. The inlet duct has a tapering portion extending towards the inlet port such that the cross-sectional area of the inlet duct decreases as the distance from the inlet port decreases. The flow management device is positioned at a distance upstream of the inlet port such that the effective flow area through the flow management device is greater than it would be if the flow management device were positioned adjacent the inlet port and is greater than a minimum value so as to prevent excessive back pressure at high gas flow rates.

Each of the vanes may be arranged at an angle with respect to an axis extending in the direction of flow of the gas through the inlet duct so as to impart the swirling motion to the gas. Each of the vanes may be a fixed rigid vane.

In one embodiment, the inlet duct has at least one bend and the flow management device is located in the inlet duct between the inlet port and the last bend in the inlet duct.

In one embodiment, the configuration of the flow management device is optimized to produce, for at least one operating condition, a swirling motion in the same rotational direction as the direction of rotation of the compressor wheel to the air entering the inlet port with a swirl magnitude that falls within a predetermined range.

The flow management device may be optimized to reduce the relative velocity between the gas entering through the inlet and the compressor wheel without significantly reducing pump efficiency.

The flow management device may be optimized to reduce the relative velocity between the gas entering through the inlet and the pump member without significantly reducing pump efficiency.

The flow management device may be optimized to reduce: the probability of rotating stall, the probability of surge and the generation of noise.

The configuration of the flow management device may comprise the shape, size, orientation and number of vanes.

The magnitude of swirl produced by the flow management device and the loss in swirl magnitude due to losses in the tapering inlet duct between the flow management device and the inlet port may produce, for at least one operating condition, a swirl magnitude falling within the predetermined range.

The at least one operating condition may be a predetermined mass flow rate of gas through the inlet duct.

The radial compressor may be one of a compressor of a turbocharger and a compressor of a supercharger.

According to an embodiment of the disclosure, there is provided a method for improving the performance of a radial compressor, including: locating a flow management device having a number of fixed vanes upstream from the compressor to produce a pre-swirl to the air entering the compressor and optimizing the flow management device so as to ensure the back pressure produced by the flow management device is below a predetermined limit.

The method may further include optimizing the configuration of the flow management device to produce for at least one operating condition the pre-swirl in the same rotational direction as the direction of rotation of a compressor wheel of the radial compressor and with a swirl magnitude that falls within a predetermined range.

BRIEF DESCRIPTION OF THE DRAWINGS

The disclosure will now be described by way of example with reference to the accompanying drawing of which.

DETAILED DESCRIPTION

Figure 1:
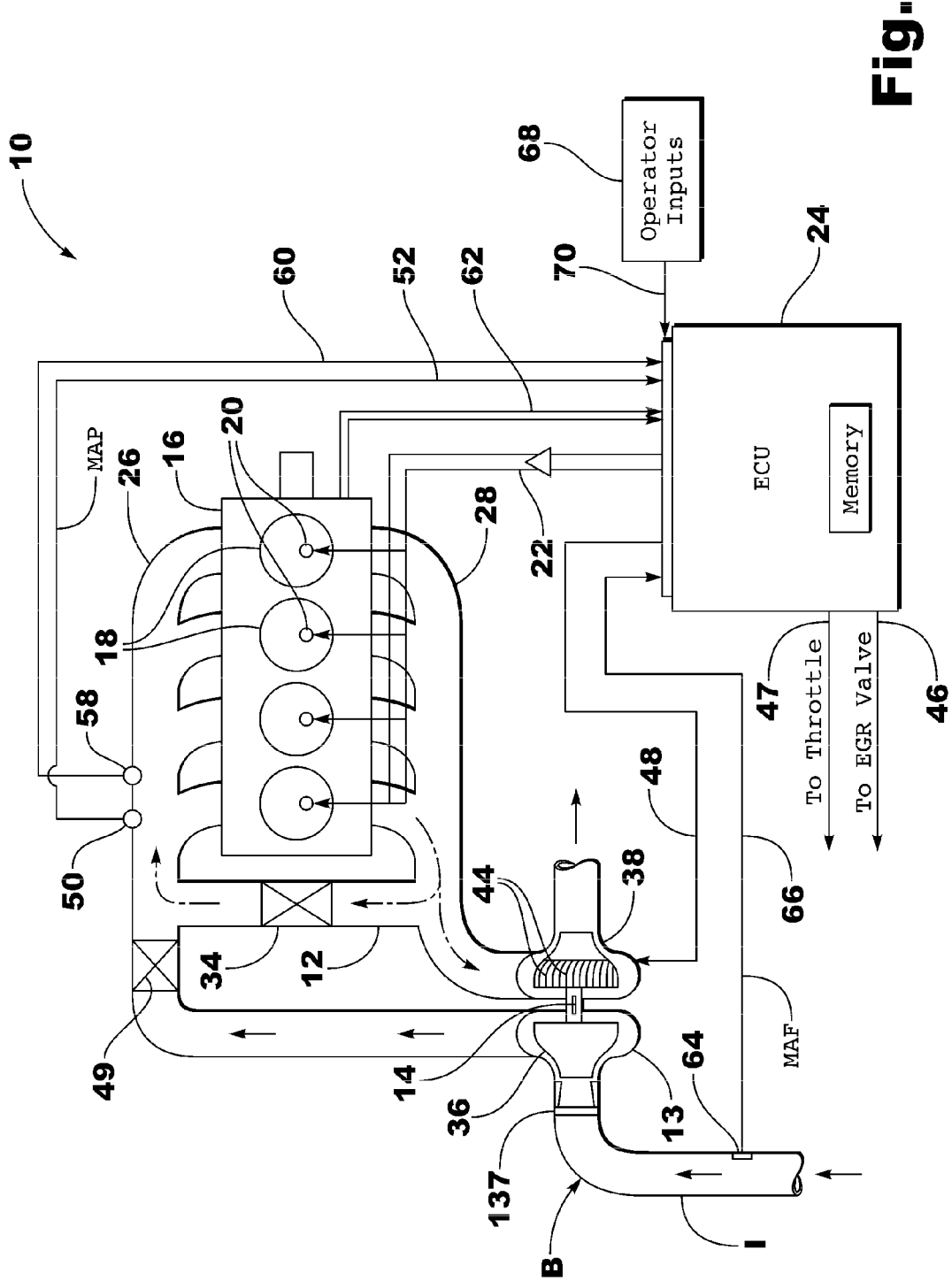
FIG. 1 is a schematic representation of an engine having a turbocharger and inlet system according to the disclosure.
Figure 3:
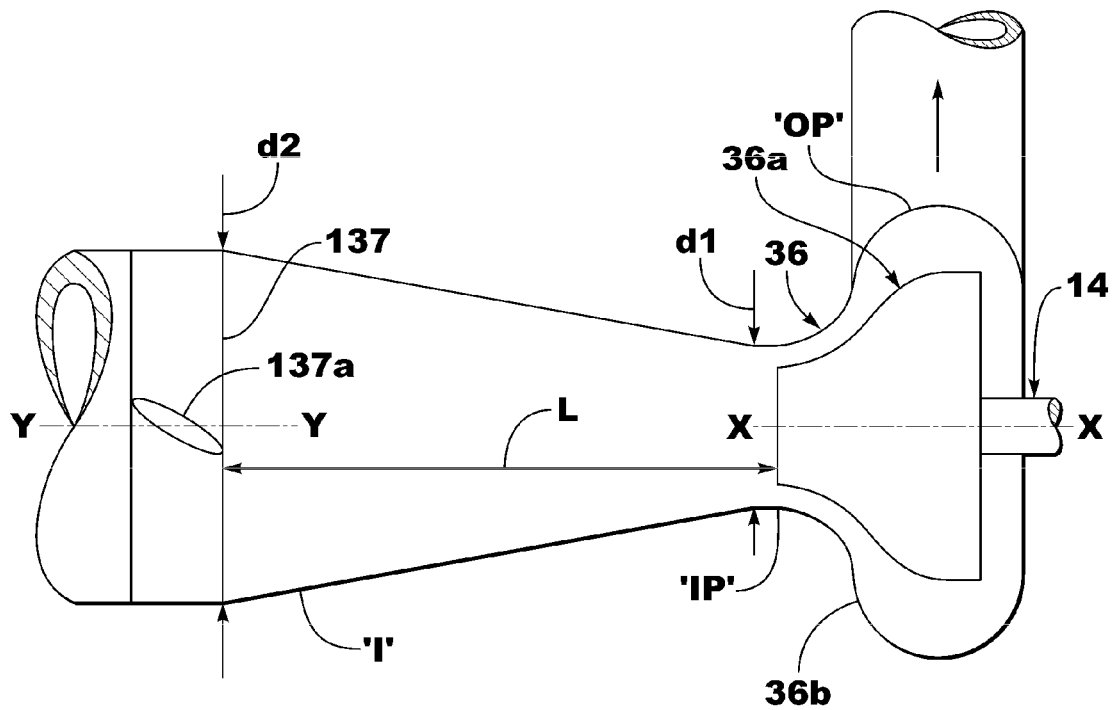
FIG. 3 is a schematic cross-section through part of an inlet duct forming part of the inlet system shown in FIG. 1.

Referring now to FIGS. 1 and 3, a spark ignition engine system 10 is shown. The engine includes an exhaust gas recirculation (EGR) system 12 and a turbocharger 14 having a radial compressor portion 36 and a turbine portion 38 with the turbine portion 38 having an inlet flow control device 44 with open and closed positions. The inlet flow control device 44 is an inlet area control device for the turbine portion 38 in the form of the set of moveable turbine vanes.

A representative engine block 16 is shown having four combustion chambers 18 each of which includes a fuel injector 20. The duty cycle of the fuel injectors 20 is determined by an engine control unit (ECU) 24 and transmitted along signal line 22. Air enters the combustion chambers 18 through the inlet or intake manifold 26 and combustion gases are exhausted through the exhaust manifold 28.

A flow management device 137 is positioned upstream from the radial compressor 36 in an inlet duct 'I' which extends to an air cleaner (not shown) through which air is drawn in from the atmosphere. The flow management device is positioned downstream of the bend 'B' of the inlet duct and upstream of an inlet port 'IP' of the turbocharger 14.

To reduce the level of NOx emissions, engine 10 is equipped with EGR system 12 which in this case comprises a conduit connecting the exhaust manifold 28 to the intake manifold 26 and an EGR valve 34 to regulate the amount of exhaust gas recirculated from exhaust manifold 28. The flow of exhaust gas though EGR valve 34 is a function of the pressure across valve 34 in addition to an electrical signal provided to valve 34 on line 46 from ECU 24.

The electrical signal on line 46 is produced by ECU 24 from relationships stored in ECU 24 in accordance with a computer program stored in ECU 24.

Turbocharger 14 uses exhaust gas energy to increase the mass of the air charge (i.e., boost) delivered to the engine combustion chambers 18.

All of the engine systems, including EGR valve 34, turbocharger 14 and fuel injectors 20 are controlled by ECU 24. For example, a signal 46 from ECU 24 regulates the EGR valve position, a signal 48 regulates the position of the turbocharger inlet area control device 44 and a signal on line 47 controls a throttle valve 49.

Turbocharger 14 includes radial compressor 36 and turbine 38 coupled by a common shaft and, as is well known in the art, the exhaust gas drives turbine 38 which drives the compressor 36, which in turn, compresses ambient air and directs it to intake manifold 26 via an outlet port 'OP'.

An intake manifold pressure (MAP) sensor 50 provides a signal 52 to ECU 24 indicative of the pressure in intake manifold 26, an air charge temperature sensor 58 provides a signal 60 to ECU 24 indicative of the temperature of the intake air charge and a MAF sensor 64 provides a signal via line 66 indicative of air flow.

Additional sensor inputs are also received by ECU 24 along signal line 62 such as engine coolant temperature, engine speed and throttle position and operator inputs 68 are received along signal 70 such as accelerator pedal position. ECU 24 uses the inputs from these sensors to control operation of the engine system in accordance with software stored in ECU 24.

Referring now to FIG. 3, there is shown on an enlarged scale the radial compressor 36 and the flow management device 137 located in the inlet duct 'I'. The term radial compressor, as meant herein, refers to a device in which the relative velocity between the incoming gas and a rotating blade or vane has a Mach number of approximately 0.3. Such devices having a low relative Mach number are sometimes referred to as centrifugal blowers or fans.

Radial compressor 36 comprises a compressor wheel 36a mounted in a compressor housing 36b for rotation about an axis X-X. The inlet port 'IP' is provided in a housing 36b through which air is supplied to a central portion or eye of compressor wheel 36a. Outlet port 'OP' is also formed in housing 36b through which the air at increased pressure is supplied to inlet manifold 26.

Flow management device 137 is positioned a predetermined distance 'L' upstream from inlet port 'IP' in inlet duct 'I' to impart a swirling motion or pre-swirl to air entering through inlet port 'IP'.

Flow management device 137 includes multiple fixed rigid vanes 137a, each of vanes 137a extends radially with respect to an axis Y-Y extending in the direction of flow of the air through inlet duct 'I' and is arranged at an angle with respect to axis Y-Y so as to impart the swirling motion to the air. It will be appreciated that vanes 137a could be formed as an integral part of inlet duct 'I'. But in most cases, vanes 137a are formed as part of a tubular member or ring secured in a bore of inlet duct 'I'. A fixed vane is one whose angle relative to the Y-Y axis is fixed. A rigid vane is one that is sufficiently rigid to prevent significant distortion due to the action of the air flowing over the vane.

Flow management device 137 is located at the larger end of a tapering portion of inlet duct 'I' that extends towards inlet port 'IP' such that the cross-sectional area of inlet duct 'I' decreases as distance from inlet port 'IP' decreases. This allows flow management device 137 to be positioned upstream from inlet port 'IP' a distance 'L' where the diameter of inlet duct 'I' is such that the effective flow area through flow management device 137 is greater than the minimum value, Amin, so as to prevent excessive back pressure at high gas flow rates, by having:

$(\pi d1^2/4 - \text{Area occupied by vanes})$ is less than (Amin); and $(\pi d2^2/4 - \text{Area occupied by vanes})$ is greater than (Amin).

where d1 is the diameter of the inlet duct 'I' where it adjoins the inlet port 'IP';

d2 is the diameter of the inlet duct 'I' where the flow management device is positioned; and Amin is the smallest flow area that will not produce an unacceptable back pressure.

By using such a tapering inlet duct 'I' and spacing flow management device 137 in a larger diameter portion of inlet duct 'I', the back pressure is reduced. This is significant when turbocharger 14 is operating at high loads and speeds because inlet instability will occur if the back pressure is too high. The probability of instability and consequential back flow is considerably reduced when the diameter of inlet port 'IP' is relatively small such is often the case for turbochargers used on engines of small capacity such as those used in passenger vehicles if flow management device 137 is positioned in an inlet duct that is of a larger diameter than the diameter of the inlet port.

For example in one embodiment of the disclosure, the radial compressor of the turbocharger had an inlet diameter of 37 mm and it was found that if a flow management device was fitted directly to the inlet port an unacceptable back pressure was produced at high mass flow rates. However, by using an inlet duct having a tapering inlet, per an embodiment of the present disclosure, it was found that a flow control device located upstream from the inlet port approximately 100 mm in a portion of the inlet duct where the bore was 55 mm reduced the back pressure to an acceptable level while generating the required swirl magnitude at the inlet port of the radial compressor.

The configuration of flow management device 137 comprises the shape, size, orientation and number of vanes 137a and it will be appreciated that varying any of these attributes will vary the magnitude of swirl produced for a given mass flow rate.

Flow management device 137 is located downstream of the bend 'B' in the inlet duct 'I' to minimize flow distortion after the air has exited flow management device 137. Because the flow management device is used to produce a predetermined magnitude of swirl to the air, if the air flows through a bend after passing through flow management device 137, the flow may be distorted and the advantages obtained from the use of flow management device 137 may be lost or significantly reduced. Similarly, by using a tapering duct 'I' a more uniform flow regime is produced than with a duct having sudden diameter changes or steps.

It will be appreciated that the rate of change in diameter does not have to be constant along the length of the tapering portion as shown in FIG. 3 and so, for example the duct may increase slowly in diameter near to inlet port 'IP' and more rapidly further away from inlet port 'IP'.

Figure 2:
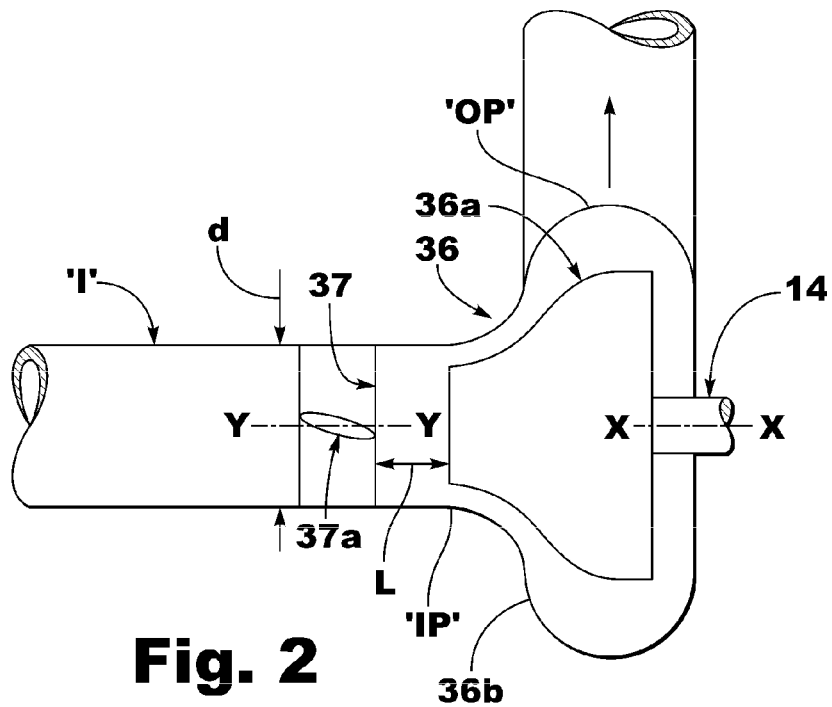
FIG. 2 is a schematic cross-section through part of a prior art inlet system.

Referring now to FIG. 2 there is shown, on an enlarged scale, radial compressor 36 and a flow management device 37 located in an inlet duct 'I' according to a prior art embodiment.

A radial compressor 36 includes a compressor wheel 36a mounted in a compressor housing 36b for rotation about an axis X-X. An inlet port 'IP' is provided in housing 36b through which of air is supplied to a central portion or eye of compressor wheel 36a. An outlet port 'OP' is also formed in housing 36b through which the air at increased pressure is supplied to inlet manifold 26.

A flow management device 37 is positioned upstream from the inlet port 'IP' in an inlet duct 'I' of constant diameter 'd' so as to impart a swirling motion or pre-swirl to the air entering through the inlet port 'IP'.

Flow management device 37 includes a number of vanes 37a; each of vanes 37a is arranged at an angle with respect to an axis Y-Y extending in the direction of flow of the air through inlet duct 'I' to impart swirling motion to the air.

In an additional embodiment of the disclosure, flow management device 137 is optimized to reduce the relative velocity between the air entering through the inlet port and compressor wheel 36a without significantly reducing pump efficiency. This is accomplished by careful design of the vanes 137a in terms of their shape, size, orientation and number so as to produce a small negative swirl the magnitude of which falls within predetermined limits. The term 'negative swirl' means a swirl or rotary flow that is of the same direction as the direction of rotation as the compressor wheel 36a and the term 'positive swirl' means a swirl that is in the opposite direction to the direction of rotation of the compressor wheel 36a.

By conducting experiments using a P7300 model 150 impulse swirl meter manufactured by Cussons Technology Ltd of 102 Great Clowes street Manchester UK hereinafter 'swirl meter', the applicants have confirmed that such predetermined range of negative swirl is within a non-dimensional swirl number (NDSN) range of minus 0.1 to minus 2.0, as measured on the swirl meter.

$$NDSN = 8*Sm*S*Mconst*S*Mcorr/(m*Vo*B)$$

where
NDSN=non-dimensional swirl number;
Sm=swirl meter reading;
SMconst=swirl meter calibration constant;
SMcorr=swirl meter correction factor;
m=measured mass flow rate;
V0=mean fluid velocity; and
B=swirl rig cylinder bore.

The effect of the negative swirl is to reduce the velocity of the air relative to the rotating blades of the compressor wheel 36a and if the magnitude of this swirl is arranged to fall between predetermined limits then the pumping efficiency of the radial pump 36 will be increased due to a reduction in the separation of the flow from the blades or vanes of the compressor wheel 36a.

The flow management system may be designed to impart a negative swirl to the air if the air has no distinct swirl or a positive swirl and to impart a positive swirl to the air if the air has a high negative swirl magnitude.

For example, if the air flowing through the inlet duct 'I' has an initial NDSN, as measured by the swirl meter, of −3.5 then flow management device 137 is arranged to impart a positive swirl to the air to reduce the NDSN so that it falls within the predetermined range of −0.1 to −2.0. This is done to improve the pumping efficiency of radial compressor 36 due to the low relative velocity between the air and the blades or vanes of compressor wheel 36a.

Conversely, if the air initially has a positive swirl of +1.5, for example, then the flow management device is designed to impart a significant negative swirl to the air to reverse its flow direction and bring it within the predetermined limits. If air having a positive swirl is supplied to radial compressor 36, the efficiency is low due to separation of the flow from the blades or vanes of compressor wheel 36a due to the increase in relative velocity between the air and the blades or vanes compressor wheel 36a. Such separation may lead to rotating stall or surge in radial pump 36 and hence noise production.

According to embodiments of the disclosure, excessive backpressure is avoided. Flow management device 137 reduces the effective cross area of the inlet duct 'I' through which the air flows. At high speeds and loads, this may result in the radial compressor 36 being starved of air causing runaway or inlet manifold instability such as back flow. To prevent starvation, flow management device 137 is designed to have an effective flow area greater than the minimum value Amin. Amin, which in one embodiment is a predetermined value, is based on the maximum expected flow rate of air at the most demanding condition and the maximum acceptable pressure drop, i.e., one that prevents the radial compressor from being starved of air at the maximum expected flow rate of air.

By ensuring that the effective flow area through the flow management device 137 is greater than this minimum effective cross-sectional area (Amin), the pressure drop at high gas flow rates is below an acceptable level, thereby preventing excessive back pressure.

The greater the distance 'L' between flow management device 137 and the compressor wheel 36a, the greater the loss of swirl due to viscous losses. In such a situation, flow management device 137 is designed to produce a greater magnitude of negative swirl to compensate for losses so that the flow entering the radial pump 36 remains in the predetermined swirl magnitude range.

Use of a tapered inlet duct with a flow management device 137 is able to provide the required swirl without producing unacceptably high back pressure and is particularly advantageous for use on smaller radial compressors typically used for cars and light commercial vehicles.

One advantage, according to an embodiment of the disclosure, is that by separating the flow management device from the radial compressor by distance 'L' in a tapering duct, back pressure produced by the flow management device can be controlled using a flow management device in a duct of larger diameter. This cannot be achieved if the size of the flow management device is governed by inlet port diameter either by the fitment of vanes within the inlet port or the attachment of the flow management device directly to the inlet port.

Another advantage of the disclosure is that the optimization of a flow management device, in the manner described, not only improves the performance of the radial compressor in terms of pumping efficiency at low to moderate speeds it also potentially reduces: the probability of rotating stall, the probability of surge, and the generation of noise.

Although radial compressor 36 is described above in relation to a turbocharger it will be appreciated that the disclosure could be applied with equal advantage to a radial compressor of a supercharger.

Although the disclosure is described with respect to a turbocharged spark ignited engine, it can be applied to other types of engines requiring forced induction, for example, and without limitation, a diesel engine or homogeneous charge compression ignition engine. The term "improving the performance of a radial compressor" used herein includes not only improvements in pumping efficiency but also improvements in the reduction of stall, surge, and noise propagation.

Figure 4:
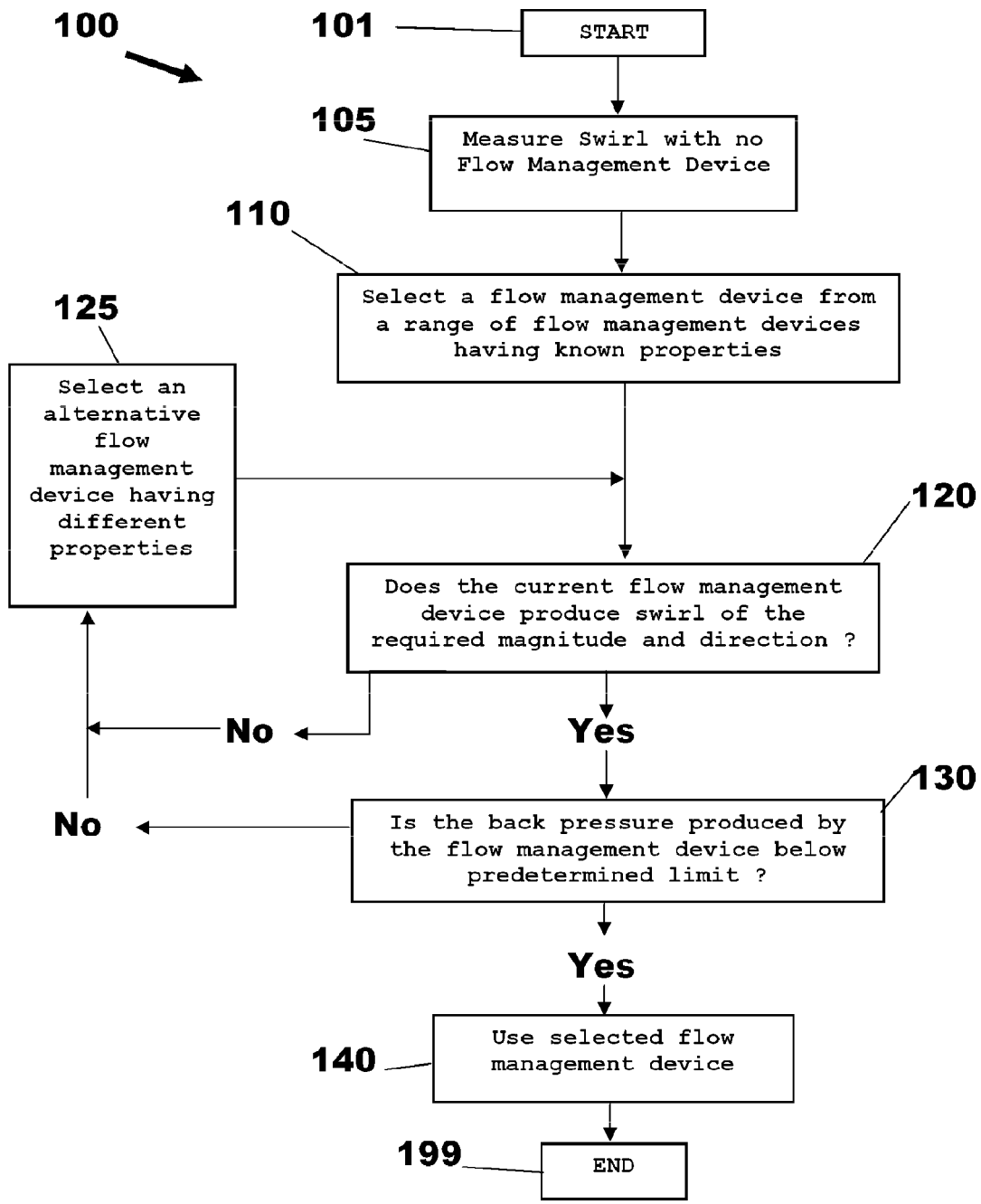
FIG. 4 is a high level block diagram of a first embodiment of a method for improving the performance of a radial compressor.

Referring to FIG. 4, a method 100 for improving the performance of a radial compressor starts at step 101. In 105, the current flow conditions are determined using an impulse swirl meter such as the Cussons P7300 Impulse Swirl Meter referred to above. This type of swirl meter responds to the total angular momentum flux in the swirling air flow and uses a swinging honeycomb type matrix, which is restrained from rotation by a strain-gauged load cell, to totally arrest the angular swirl component thereby measuring the resultant angular impulse as a torque.

The P7300 honeycomb matrix is mounted within a cylindrical housing and the dimensions of the individual cells of the matrix are suitable for arresting the swirl of the incoming air. The matrix is connected via a torque arm to a strain gauge transducer which is calibrated by suspending weights over pulleys either side of the torque arm.

The strain gauge transducer is rated at 220g, measured as a positive or negative force and the length of the torque arm is such as to enable torque values up to 1×10−1 N-m to be measured.

A non-dimensional swirl number, NDSN, can be derived from the swirl meter using the general equation:

$$NDSN = K * Torque/(Q * V\_eff * D)$$

in which:
K is a calibration constant term;
Q is the mass flow rate;
D is the diameter of duct through the swirl meter; and
V_eff is the effective flow velocity.

In 110, using the NDSN obtained from 105, one of a number of alternative flow management devices is chosen. The selection of the flow management device depends upon the diameter of the inlet duct into which it must be fitted, the type of swirl correction required e.g. positive or negative and the magnitude of the correction required.

Each of the flow management devices have been developed and tested to determine the swirl inducing effects and the pressure drop expected for a specific mass flow rate.

In 120 the flow management device is tested in the inlet duct using the swirl meter to determine whether the swirl produced is of the correct direction and magnitude, i.e., within the predetermined range of NSDN, e.g., −0.1 to −2.0.

If in 120 it is confirmed that the swirl produced is within the desired range, then the method advances to 130 where the pressure drop across the flow management device is checked for a predetermined mass flow rate to confirm that it is acceptable. Conversely, if the swirl produced is unacceptable, the method advances to 125 where an alternative flow management device is selected. The method then returns to 110 and the method loops through 110, 120 and 125 until an acceptable swirl is produced.

If at 130 the pressure drop is confirmed to be acceptable, then the method advances to 140 where the flow management device is adopted for use in production after which the method ends at 199. Conversely, if the pressure drop measured in 130 is unacceptable, the method advances to 125 where an alternative flow management device is selected. The method then returns to 110 and the method will loop through 110, 120, 130 and 125 until an acceptable swirl and pressure drop are produced by the flow management device. Pressure drop for a specific mass flow rate is directly related to the effective flow area. Therefore to reduce the pressure drop for a given mass flow rate, the effective flow area is increased.

The queries in blocks 120 and 130 can be performed concurrently. The NDSN and pressure drop may be measured for a range of mass flow rates corresponding to expected minimum and maximum mass flow rates in use.

The predetermined range of swirl magnitudes used in 120 is chosen so as to reduce the relative velocity between the gas entering through the inlet and the compressor wheel for a range of operating conditions without significantly reducing pump efficiency. Additionally, rotating stall, surge and generation of noise are also kept in check.

In 140, using the selected flow management device includes locating the flow management device upstream of the inlet port of the radial compressor and downstream of the bend in the inlet duct and designing the inlet duct to have a diameter to match a flow management device of the chosen diameter by using an inlet duct having a tapered shape so as to accommodate the flow management device while being sized to connect to the housing of the radial compressor.

Figure 5:
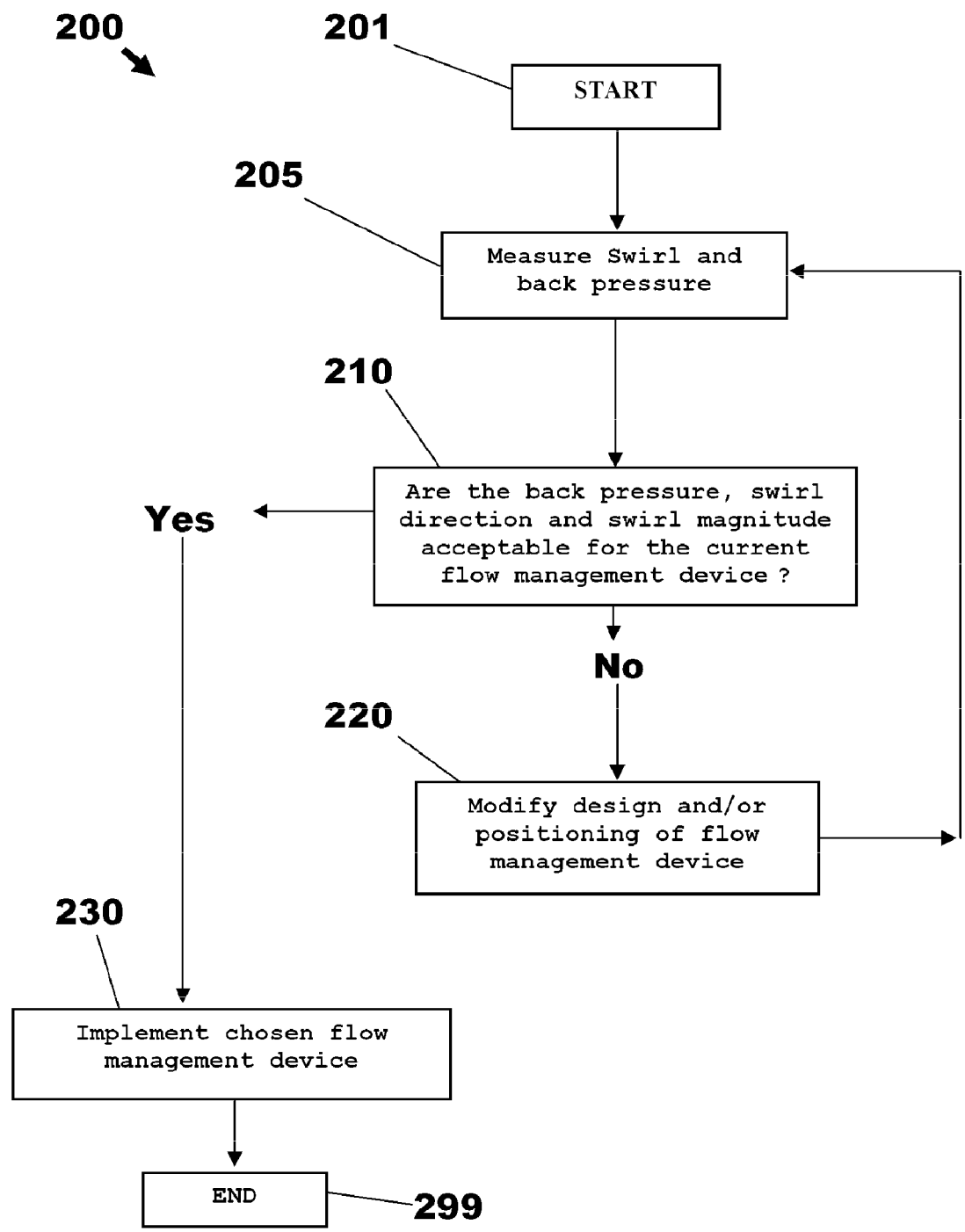
FIG. 5 is a high level block diagram of a second embodiment of a method for improving the performance of a radial compressor.

With reference to FIG. 5 there is shown an embodiment of for improving the performance of a radial compressor, which is particularly suitable if the flow management device is formed as part of the inlet duct.

Embodiment 200 starts at 201 and then in 205 the swirl and back pressure of an inlet duct fitted with a flow management device are measured for a range of operating conditions using a test rig. The swirl magnitude is determined in the form of a NDSN obtained from an impulse swirl meter.

In 210, it is determined whether the magnitude of swirl falls within the predetermined range and the pressure drop is less than the maximum acceptable pressure drop. If both of the tests are passed, advance to 230 where the chosen flow device is implemented and thereafter ends at 299.

In 230, implementing the chosen flow management device includes manufacturing the flow management device and inlet duct according to the optimized design and putting the optimized parts into service.

In 210, if one of the swirl magnitude or the pressure drop are not acceptable, advance to 220 where the design is modified. This design modification may include changing one or more of: the diameter of the flow management device, the size or shape of the vanes, the number of vanes, the orientation of the vanes, the position of the flow management device in the inlet duct and the size or shape of the inlet duct so as to have a diameter to match a flow management device of the chosen diameter which may require the inlet duct having a tapered shape so as to accommodate the flow management device while being sized to connect to the housing of the radial compressor. The use of flow modeling techniques such as CFD may be used to assist with this modification process.

According to the disclosure, the performance of a radial compressor is improved by inducing pre-swirl to the incoming flow to the compressor impeller (compressor wheel), in the same sense as the impeller rotation. The relative velocity is thereby reduced and the onset of rotating stall and/or surge prevented thus conserving or improving, compressor efficiency and preventing noise generation. This is achieved by using a flow management device in the inlet duct to generate a low level of pre-swirl in the same sense as the compressor rotation. Specifically, the introduction of guide vanes situated upstream of the compressor inlet situated at a location that optimizes the generation of pre-swirl to the flow field while minimizing the associated pressure drop generated by the introduction of the flow management device an optimized solution is produced.

It will be appreciated by those skilled in the art that although the disclosure has been described by way of example with reference to one or more embodiments it is not limited to the disclosed embodiments and that one or more modifications to the disclosed embodiments or alternative embodiments could be constructed without departing from the scope of the disclosure as set out in the appended claims.

What is claimed is:

1. An engine inlet system, comprising:
   a compressor having an inlet port;
   an inlet duct having at least one bend and a tapering section connected to the inlet port; and
   a flow management device having radially-extending, fixed vanes coupled upstream of the tapering section and downstream of the at least one bend to impart a swirling motion at the inlet port having a negative swirl magnitude of between about 0.1 and 2.0.

2. The inlet system of claim 1 wherein effective flow area of the flow management device is based on an inside diameter of the flow management device minus an area occupied by the vanes.

3. The inlet system of claim 1 wherein effective flow area of the flow management device is greater than the smallest flow area that prevents an unacceptable back pressure at the largest expected flow rate.

4. The inlet system of claim 1 wherein the cross-sectional area of the inlet duct minus an area occupied by the vanes is greater than a predetermined area.

5. The inlet system of claim 1 wherein the cross-sectional area of the inlet port decreases uniformly as distance from the compressor decreases.

6. An inlet system for an engine, comprising:
   a radial compressor mounted in a compressor housing including inlet and outlet ports;
   a tapering inlet duct having a bend connected to the inlet port; and
   a flow management device having radially-extending fixed vanes spaced from the inlet port downstream of the bend to impart a negative swirl having a non-dimensional swirl number of between about minus 0.1 and minus 2.0 to the gas entering the inlet port.

7. The inlet system of claim 6 wherein the radial compressor is one of a compressor of a turbocharger and a compressor of a supercharger.

8. An internal combustion engine, comprising:
   an inlet manifold for supplying air to the engine;
   a radial compressor;
   an inlet port to the radial compressor;
   an outlet port from the radial compressor coupled to the inlet manifold;
   an inlet duct connected to the inlet port to provide air to the radial compressor, wherein the inlet duct has at least one bend; and
   a flow management device having a number of radially-extending fixed vanes positioned in the inlet duct upstream from the inlet port and downstream of the at least one bend to impart a swirling motion to the gas entering through the inlet port having a magnitude that falls within a range of negative swirl of between about 0.1 and 2.0, wherein the inlet duct tapers such that the cross-sectional area of the inlet duct decreases as the distance from the inlet port decreases, the flow management device having an effective cross-sectional area greater than a predetermined area and positioned upstream relative to where the inlet duct tapers.

9. The engine of claim 8 wherein the effective flow area is based on an inside diameter of the flow management device minus an area occupied by the vanes.

10. The engine of claim 8 wherein the predetermined area is the smallest flow area that prevents an unacceptable back pressure at the largest expected flow rate.

11. The engine of claim 8 wherein the cross-sectional area of the inlet duct minus an area occupied by the vanes is greater than the predetermined area.

* * * * *